United States Patent [19]

Krounbi et al.

[11] Patent Number: 4,935,278
[45] Date of Patent: Jun. 19, 1990

[54] THIN FILM MAGNETIC RECORDING DISK AND FABRICATION PROCESS

[75] Inventors: Mohamad T. Krounbi, San Jose; Alvin M. Patlach, Los Gatos; Ian L. Sanders, Morgan Hill, all of Calif.

[73] Assignee: International Business Machines Corporation, Armonk, N.Y.

[21] Appl. No.: 187,110

[22] Filed: Apr. 28, 1988

[51] Int. Cl.$^5$ .............................................. G11B 23/00
[52] U.S. Cl. ................... 428/64; 204/192.2; 204/192.22; 204/192.3; 204/192.32; 427/131; 427/282; 428/163; 428/164; 428/694; 428/900
[58] Field of Search ................ 428/900, 163, 164, 64, 428/65, 694; 427/294, 129, 130, 131, 282, 419.1, 419.2; 430/322; 204/192.32, 192.30, 192.22, 192.15, 192.2

[56] References Cited

U.S. PATENT DOCUMENTS

| | | | |
|---|---|---|---|
| 3,655,441 | 4/1972 | Kefalas | 117/237 |
| 4,057,831 | 11/1977 | Jacobs et al. | 358/128 |
| 4,109,045 | 8/1978 | Goshima et al. | 428/212 |
| 4,517,616 | 5/1985 | Bischoff | 360/126 |
| 4,554,217 | 11/1985 | Grimm et al. | 428/469 |
| 4,560,641 | 12/1985 | Kokaku et al. | 430/312 |
| 4,610,911 | 9/1986 | Opfer | 428/213 |
| 4,624,740 | 11/1986 | Abrams et al. | 156/643 |
| 4,687,541 | 8/1987 | Penney | 156/643 |
| 4,689,260 | 8/1987 | Briska et al. | 428/161 |
| 4,708,766 | 11/1987 | Hynecek | 156/643 |
| 4,746,580 | 5/1988 | Bishop et al. | 428/557 |

FOREIGN PATENT DOCUMENTS

58-212624 12/1983 Japan .
59-112434 6/1984 Japan .
1443248 7/1976 United Kingdom .

OTHER PUBLICATIONS

J. J. Cuomo, et al. "Dry Lithographic Method for Patterning Storage Media", IBM Technical Disclosure Bulletin, vol. 27,. No. 1B, Jun. 1984, p. 505.

A. M. Homola, et al. "Discrete Magnetic Tracks in Storage Disks", IBM Technical Disclosure Bulletin, vol. 24, No. 6, Nov. 1981, p. 2794.

M. F. Doerner, et al. "Magnetic Recording Disk with High Start/Stop Durability and Low Magnetic Errors", IBM Technical Disclosure Bulletin, vol. 23, No. 1, Jun. 1980, p. 306.

A. Brunsch, et al. "Magnetic Record Carrier with Discrete Tracks", IBM Technical Disclosure Bulletin, vol. 22, No. 8A, Jan. 1980, p. 3268.

A. S. Hoagland, "Recording Medium with Discrete Alternate Track of Differing Coercive Force", IBM Technical Disclosure Bulletin, vol. 20, No. 7, Dec. 1977, p. 2820.

C. H. Bajorek, et al. "Magnetically Discrete but Physically Continuous Recording Tracks", IBM Technical Disclosure Bulletin, vol. 18, No. 5, Oct. 1975, p. 1641.

F. H. Appel, "Treatment of Recording Material", IBM Technical Disclosure Bulletin, vol. 6, No. 2, Jul. 1963, p. 14.

S. E. Lambert, et al. "Recording Characteristics of Submicron Discrete Magnetic Tracks", IEEE Trans. Mag., vol. 23, Sep. 1987.

IBM Press Release dated Nov. 19, 1987.

Primary Examiner—Paul J. Thibodeau
Assistant Examiner—Stevan A. Resan
Attorney, Agent, or Firm—G. Marlin Knight; Thomas R. Berthold

[57] ABSTRACT

A discrete track thin film metal alloy or metal oxide magnetic recording disk is fabricated by forming a thin film of magnetic material on a substrate, patterning the magnetic film with a chemically etchable support layer and a high resolution photoresist layer, removing portions of the magnetic film and refilling with nonmagnetic material to form concentric nonmagnetic guard bands, and then applying a top layer of additional nonmagnetic material as a passivating and protective disk overcoat after removal of the remaining support layer and photoresist. The exposed photoresist and portions of the chemically etchable support layer beneath the side walls of the patterned photoresist defining the edges of the magnetic tracks are removed in a photoresist developer which also creates undercuts in the support layer beneath the side walls. The undercuts prevent "fences" and provide smooth interfaces between the magnetic tracks and the nonmagnetic guard bands. In one embodiment of the disk, a continuous layer of nonmagnetic material serves as both the guard bands and the protective overcoat and has a height in the guard band regions greater than the height of the adjacent magnetic tracks so as to prevent damage to the magnetic tracks in the event the magnetic tracks are contacted by the slider which supports the read/write head.

18 Claims, 2 Drawing Sheets

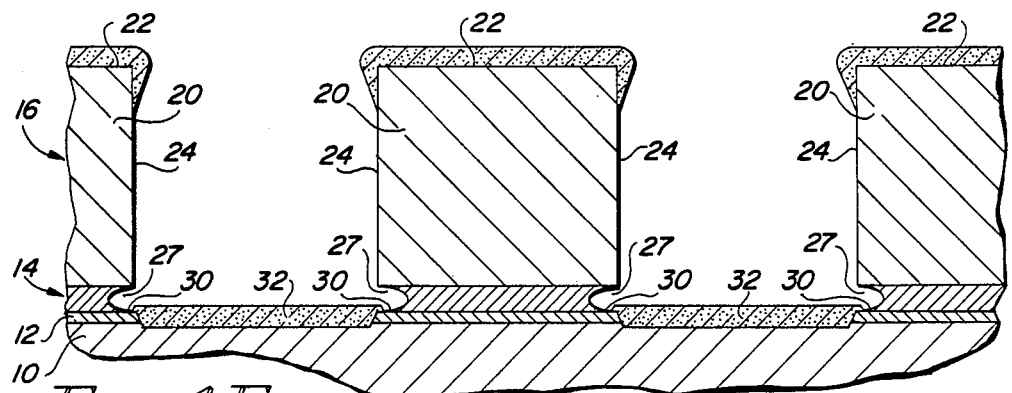
FIG.-1F
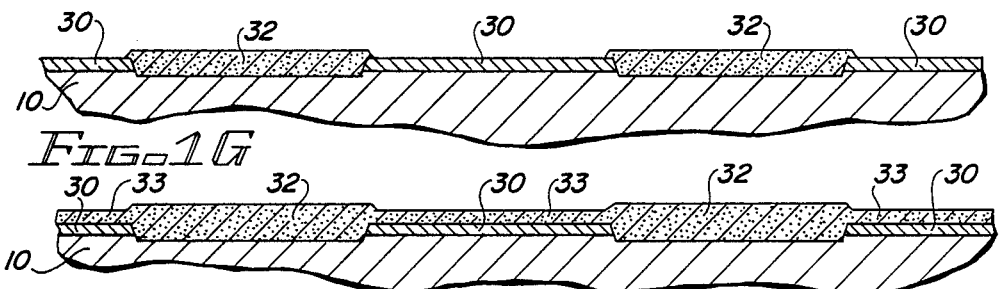
FIG.-1G
FIG.-1H
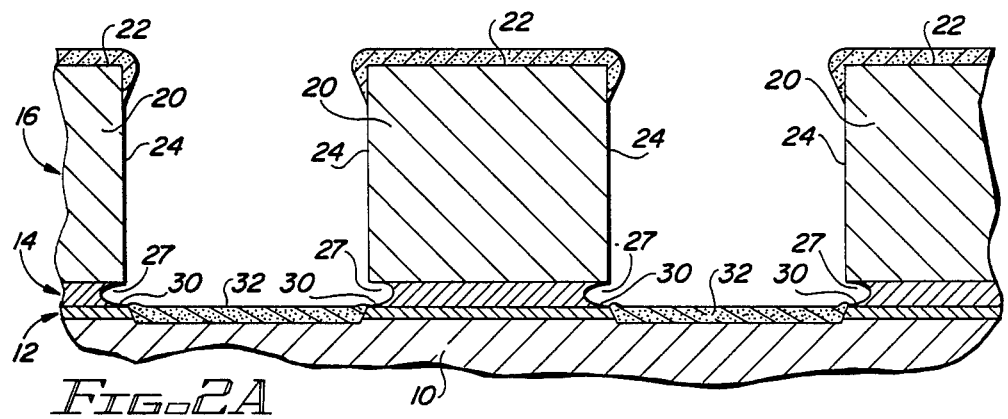
FIG.-2A
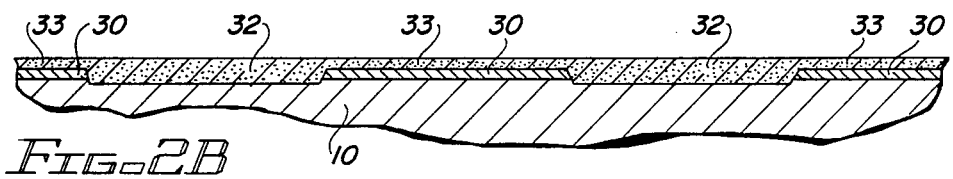
FIG.-2B

THIN FILM MAGNETIC RECORDING DISK AND FABRICATION PROCESS

TECHNICAL FIELD

This invention relates to thin film metal alloy or metal oxide magnetic recording disks and processes for their fabrication.

BACKGROUND OF THE INVENTION

Conventional thin film magnetic recording disks typically comprise a substrate, such as an aluminum alloy disk with a nickel-phosphorus (NiP) surface film, a film of magnetic metal alloy or metal oxide formed on the substrate, and a protective overcoat formed over the magnetic film. Such disks may be fabricated by evaporating or plating the magnetic film on the substrate, or in the more conventional approach by sputter depositing the magnetic film.

Regardless of the specific composition of the magnetic film or the method of fabrication of the disk, all such commercially available disks utilize a continuous film of the magnetic metal alloy or metal oxide. Thus, during operation of the disk file, data may be recorded at any radial position of the disk where the continuous magnetic film is deposited. Because the read/write head cannot always be precisely aligned over any predetermined radial position on the disk, new data recorded over a previously recorded track may be recorded on the disk in a radial position slightly offset from the track where the previous data was recorded. This may occur even though the previous data and the new data are identified as having been recorded on the same data track. When the read/write head reads the signal from this track it will also pick up previously recorded signals on the disk at the edges of the track. An additional problem with the use of continuous magnetic film in thin film disks is that because magnetic media extends radially on the disk on both sides of the read/write head, fringe magnetic fields from the read/write head during recording will generate magnetic patterns at the edges of the track. This creates disorientation of the magnetic domains in the film at the track edges which results in noise when the recorded signal is read back. Conventional thin film disks which have a continuous magnetic film also require a nonmagnetic overcoat of sufficient thickness to not only passivate the magnetic film from the atmosphere but also to provide a durable protective barrier when the disk surface is contacted by the air bearing slider which supports the read/write head.

In order to overcome the above shortcomings, thin film disks with discrete magnetic tracks separated by discrete nonmagnetic guard bands or separator tracks have been proposed. A variation of such a discrete track disk is described in Great Britain Patent specification 1,443,248. In the '248 patent, discrete tracks of low coercivity magnetic oxide are formed from a continuous film of magnetic oxide by ion implanting cobalt ions through a mask to generate concentric spaced-apart high coercivity separator tracks. The cobalt-doped high coercivity separator tracks may also serve to record head positioning servo information. The IBM Technical Disclosure Bulletin (TDB), October 1975, at page 1641, describes a discrete track thin film disk formed by depositing a film of iron or cobalt over a resist pattern previously formed on a thin film of alpha iron oxide. The disk structure is then annealed to diffuse the iron or cobalt into the alpha iron oxide to transform it into ferromagnetic material. When the resist is removed, the result is a disk with discrete magnetic tracks separated by discrete tracks of nonmagnetic alpha iron oxide. The IBM TDB, January 1980, at page 3268, describes a discrete track disk in which the discrete magnetic tracks are formed by depositing a magnetic film (or magnetic particles) into concentric grooves which have been preformed on a substrate. Japanese Kokai 58-212624 describes a discrete track thin film disk in which concentric separator tracks are formed on a continuous magnetic iron oxide film by laser radiating the disk in a concentric track pattern so as to render the concentric tracks of the iron oxide film non magnetic. Japanese Kokai 59-112434 describes a particulate disk (i.e. a disk with a conventional magnetic coating of iron oxide particles dispersed in an organic binder) in which gaps are generated in the organic coating by forming a patterned photoresist film over the organic coating and then acid etching the organic coating.

SUMMARY OF THE INVENTION

The thin film discrete track magnetic recording disk is made according to the present invention by first depositing a thin continuous film of magnetic metal alloy, such as a cobalt-based alloy, or a magnetic metal oxide, such as iron oxide, on a suitable disk substrate. A support layer of a chemically etchable material, which may be a photoresist, is then formed over the continuous magnetic film. A layer of photoresist is then formed over the support layer and exposed with radiation through a mask. The radiation-opaque pattern on the mask corresponds to the concentric data tracks which are to be subsequently formed in the magnetic film. The disk is then placed in a developer which removes the exposed photoresist and predetermined portions of the chemically etchable support layer. The remaining unexposed photoresist thus forms a predetermined pattern which includes concentric rings having side walls oriented generally perpendicularly to the disk substrate. The length of time the disk is maintained in the developer is controlled so that the material in the support layer is completely removed from between the side walls of adjacent concentric rings of unexposed photoresist and from slightly beneath the side walls of the rings. In this manner undercuts are created beneath both side walls of each ring of unexposed photoresist.

Following the removal of the exposed photoresist and the desired portion of the support layer, the magnetic film is removed from the areas between the side walls of adjacent rings of unexposed photoresist. The voids created by the removal of the magnetic film from these areas is then refilled with nonmagnetic material to a height at least as high as the height of the magnetic film to create concentric nonmagnetic guard bands separating concentric magnetic tracks. Because the support layer has been dissolved, during development of the photoresist, to create undercuts beneath the side walls of the rings of unexposed photoresist, smooth interfaces are formed between the nonmagnetic guard bands and the magnetic tracks. The remaining photoresist and support layer material is then removed.

A protective overcoat, which may be of the same material as the nonmagnetic material serving as the guard bands, is formed over the entire disk surface. In a preferred embodiment, the nonmagnetic material deposited to fill the voids created by the removal of the magnetic film is deposited to a height slightly higher than the magnetic film so that the subsequently deposited nonmagnetic material creates a disk structure in which the guard bands are raised slightly above the magnetic tracks. This results in the guard bands functioning both to separate the discrete magnetic tracks and to protect the magnetic tracks from contact by the slider which supports the read/write head. Because the slider cannot contact the magnetic tracks in such a disk structure, the protective overcoat on top of the magnetic tracks needs to have a thickness sufficient to provide only passivation from atmosphere exposure.

In the preferred process for fabricating the disk, the removal of the magnetic film from the areas between the side walls of the unexposed photoresist rings is done by sputter etching, and the refilling of the resulting voids with nonmagnetic material to create the guard bands is done by sputter deposition, thus permitting both steps to be performed in the sputtering chamber without breaking vacuum.

For a fuller understanding of the nature and the advantages of the present invention, reference should be made to the following detailed description taken in conjunction with the accompanying drawings.

BRIEF DESCRIPTION OF THE DRAWINGS

FIGS. 1A-1H illustrate a portion of the disk in a sectional view taken along a disk radius during consecutive steps of the fabrication process;

FIG. 1H is a sectional view taken along a disk radius of a portion of the disk illustrating the resulting disk structure wherein the protective overcoat over the nonmagnetic guard bands is elevated relative to the overcoat over the magnetic tracks;

FIG. 2A is a sectional view taken along a disk radius of a portion of the disk following one step in the process for making an alternative embodiment of the disk; and FIG. 2B is a sectional view taken along a disk radius of a portion of the disk made according to the fabrication process which includes the step described in FIG. 2A, wherein the protective overcoat has a planar surface.

DESCRIPTION OF THE PREFERRED EMBODIMENTS

Figure 1A:
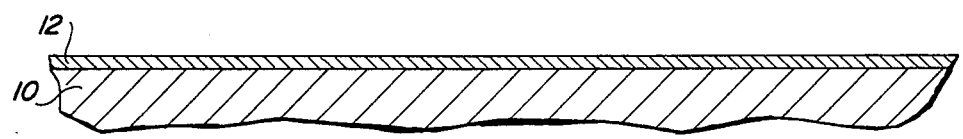

In the fabrication of the discrete track thin film disk according to the process of the present invention, a continuous film 12 of a magnetic cobalt-based alloy is sputter deposited to a thickness of approximately 300 Angstroms on a substrate 10 of a nickel-phosphorus surface film which has been plated on an aluminum alloy disk (not shown). The magnetic film 12 may also be a magnetic metal oxide, such as sputtered gamma iron oxide, and may be formed by processes other than sputter deposition, such as plating or evaporation. Substrate 10 may also be any suitable disk substrate, such as glass, ceramic or single crystal, semiconductor grade silicon. It is also within the conventional thin film disk fabrication processes to first sputter deposit a nucleating film (not shown in FIG. 1A), such as a chromium or chromium alloy film, on the substrate 10 and then sputter deposit the magnetic film 12 onto the nucleating film.

Figure 1B:
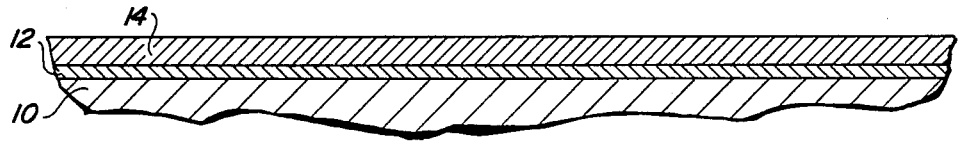

After the magnetic film 12 has been formed on the substrate 10, a support layer 14 of a chemically etchable material is formed, as shown in FIG. 1B. In the preferred embodiment, the layer 14 is low molecular weight (e.g. 32,000) poly(dimethyl glutarimide), a photoresist material, and is spun onto the surface of magnetic film 12. The layer 14 is formed to a thickness of approximately 1,000 Angstroms, after which the disk is baked at approximately 180 degrees C. for approximately 30 minutes. Layer 14 may also be formed of poly(methyl methacrylate) (PMMA), which is soluble in an organic solvent.

Figure 1C:
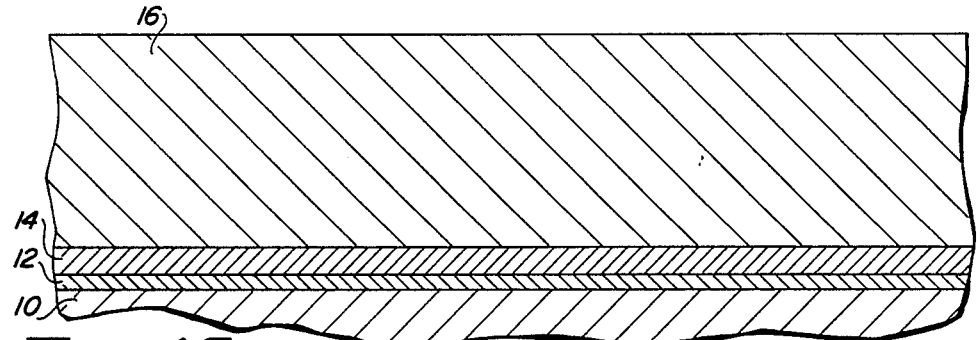

As shown in FIG. 1C, a second layer 16 of high resolution photoresist is spun to a thickness of approximately 1 micron over the support layer 14. The photoresist 16 may be any commercially available high resolution photoresist, such as Kodak 820 or Shipley 1470. The photoresist layer 16 is baked at approximately 95 degrees C. for approximately 30 minutes.

A photolithographic mask is then prepared which has a radiation-opaque pattern corresponding to the desired pattern of magnetic material to be left on disk substrate 10. This pattern includes generally concentric tracks in order to create the corresponding concentric tracks in the magnetic film. The disk as shown in FIG. 1C is then exposed through the mask. While layer 14 may also be a photoresist material, it is not necessary that it be radiation sensitive. Although it is preferred to optically expose layer 16 through a mask in order to improve the total processing time, it is also possible to use electron beam (E-beam) radiation to directly expose the desired pattern of photoresist layer 16. The E-beam exposure technique improves the resolution of the lithographic features. To further enhance the process speed, the mask technique may be changed to one where the source of illumination is a Synchrotron X-ray source, which provides resolution equivalent to serial single track exposure by an electron beam, and provides track exposure in parallel.

Figure 1D:
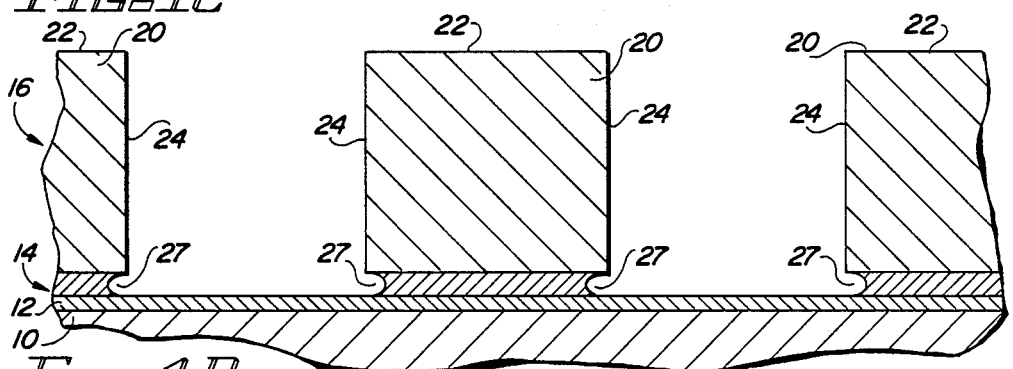

After the photoresist layer 16 has been exposed, it is placed in a suitable developer, such as Shipley AZ-351. The developer dissolves the exposed photoresist layer 16, as well as portions of chemically etchable layer 14, to create the structure shown in FIG. 1D, wherein concentric rings 20 of unexposed photoresist are supported above the magnetic film 12 by portions of support layer 14. Because the rate of development of the photoresist is known, as well as the rate of dissolution of the chemically etchable material in layer 14, it is possible to control the development step such that layer 14 dissolves in the areas beneath the side walls 24 of rings 20 to form undercuts 27. In the preferred embodiment, both the portions of exposed photoresist layer 16 and the portions of support layer 14 between the side walls 24 of adjacent rings 20 and beneath the side walls 24 are removed in a single step which includes the development step of photoresist layer 16. However, it is possible to first develop photoresist layer 16 and thereafter, in a separate step, remove suitable portions of layer 14 to create the structure shown in FIG. 1D. After the removal of the exposed portions of photoresist layer 16 and the portions of chemically etchable support layer 14, the disk is rinsed in distilled water and dried.

Figure 1E:
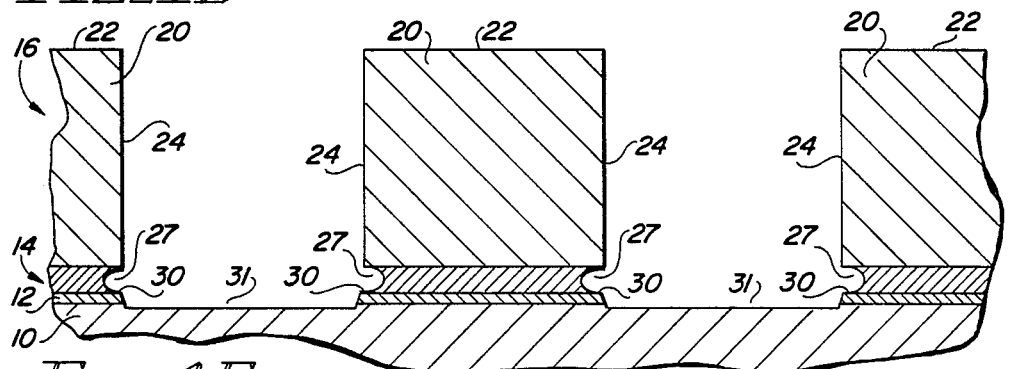

The next step in the fabrication of the disk is the removal of the magnetic film 12 between side walls 24 of adjacent photoresist layer rings 20, as shown in FIG. 1E. In the preferred embodiment, the magnetic film is removed and the voids 31 created by sputter etching. The sputter etching is performed for a length of time sufficient to not only remove all of the magnetic film 12 between the side walls 24 of rings 20, but also a portion, e.g. 200 Angstroms, of the nickel-phosphorus surface film forming substrate 10. The additional sputter etching through the top of substrate 10 assures that all of the magnetic material has been removed. The voids 31 can also be created by alternative techniques, such as ion milling or a wet chemical etch, such as etching in a ferric chloride solution. Following the removal of the magnetic film in the areas between the unexposed photoresist rings 20, a pattern of magnetic film results which creates discrete magnetic tracks 30 under the concentric rings 20 of unexposed photoresist.

The disk is maintained in the same sputtering chamber and, without breaking vacuum, a film of nonmagnetic alumina ($Al_2O_3$) is sputter deposited into the voids 31 (FIG. 1E) to create nonmagnetic guard bands 32 between the magnetic tracks 30, as shown in FIG. 1F. The formation of the undercuts 27 (FIG. 1F) prevents "fencing" at the interface of magnetic tracks 30 and nonmagnetic guard bands 32. The alumina film is also deposited over the top surfaces 22 and portions of side walls 24 of the concentric rings 20 of unexposed photoresist. In the preferred embodiment, as shown in FIG. 1F, the alumina film 32 is deposited such that its top surface has a height slightly greater than the height of the magnetic tracks 30.

The disk as shown in FIG. 1F is then removed from the sputtering chamber and placed in a suitable solvent, such as NMP (N-methyl2-pyrrolidone) or acetone. The solvent dissolves the remaining rings 20 of unexposed photoresist and the remaining portions of support layer 14, resulting in the disk structure shown in FIG. 1G. The disk structure of FIG. 1G comprises substrate 10 with discrete magnetic tracks 30 separated by guard bands 32 which not only separate the magnetic tracks with nonmagnetic material, but also provide an elevated protective surface. Because the tracks 30 may be, for example, only 1 micron in radial dimension, which is significantly smaller than a single rail of an air bearing slider, the alumina guard bands 32 prevent damage to the magnetic tracks 30 in the event the slider contacts the disk surface.

Following removal of the remaining photoresist and support layer 14, the disk is again rinsed in distilled water and dried and placed in the sputtering chamber for the deposition of additional alumina which is sputter deposited evenly over the entire surface of the disk. As shown in FIG. 1H, this results in an increased thickness of guard bands 32, as well as the placement of a passivation layer 33 of alumina over the magnetic tracks 30. Because the nonmagnetic material sputter deposited to form the guard bands 32 is identical to the material sputter deposited over the entire disk surface to provide the passivation of the magnetic tracks, the result is a continuous layer of nonmagnetic material which is formed on the substrate between the tracks and on top of the tracks. Because the magnetic tracks 30 cannot be contacted by the slider due to the elevation of the intermediate guard bands 32, the thickness of layer 33 of nonmagnetic material directly above the magnetic tracks 30 can be significantly less than if the elevated guard bands were absent. The layer 33 need be only thick enough to provide passivation of the cobalt-based alloy tracks 30 from the atmosphere. The disk structure shown in FIG. 1H, in addition to providing the benefits as previously described, also results in a textured overcoat. This substantially reduces the static friction (stiction) between the slider and the disk in those disk files in which the slider rests on the disk surface when the disk file is not operating.

Referring now to FIG. 2A, there is shown an alternative disk structure to that shown in FIG. 1F. This disk structure is created by sputter depositing the alumina layer 32 to a thickness such that it has a top surface which is essentially coplanar with the top surface of magnetic tracks 30. Then, following removal of the remaining photoresist and support layer 14, additional alumina is sputter deposited over the entire disk surface. In this disk structure, the entire top surface of the disk over both the guard bands 32 and the magnetic tracks 30 is essentially planar. The thickness of nonmagnetic layer 33 over the magnetic tracks 30 shown in FIG. 2B is sufficient to provide both passivation and protection from contact by the slider.

While in the preferred embodiments of the resulting disk structures illustrated in FIGS. 1H and 2B the nonmagnetic guard bands 32 and layer 33 over the magnetic tracks are a single continuous layer of nonmagnetic material, it is also possible to form a separate type of protective overcoat as a final sputter deposition step. Thus, the material sputter deposited over the entire disk surface to change the disk from that depicted in FIG. 1G to that depicted in FIG. 1H may be a different type of nonmagnetic material. In addition to alumina, any other type of nonmagnetic material known to have passivating and/or wear-resistant properties may be selected. Examples of such materials are oxides, for example, silicon dioxide or zirconium oxide, amorphous carbon, amorphous hydrogenated carbon and various carbides or nitrides.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method of fabricating a discrete track metal alloy or metal oxide magnetic recording disk comprising the steps of:

forming a continuous film of magnetic metal alloy or metal oxide on a disk substrate;

forming a support layer of chemically etchable material on the magnetic film;

forming a layer of photoresist on the support layer;

exposing selected regions of the photoresist layer to radiation;

developing the photoresist layer to define a predetermined pattern of unexposed photoresist over the magnetic film, said pattern including concentric rings having side walls oriented generally perpendicularly to the disk substrate;

removing the support layer material from areas between the concentric rings of the unexposed photoresist and from beneath the side walls of the concentric rings of the unexposed photoresist;

removing the metal alloy or metal oxide from the magnetic film in areas not patterned by the unexposed photoresist so as to leave magnetic metal alloy or metal oxide on the substrate, the remaining metal alloy or metal oxide defining a pattern of concentric tracks corresponding to the pattern of concentric rings of unexposed photoresist;

refilling the voids created by the removal of the metal alloy or metal oxide with nonmagnetic material to a height at least as high as the height of the magnetic tracks; and removing the remaining photoresist and the remaining support layer material.

2. A method according to claim 1 wherein the steps of developing the photoresist layer and removing the support layer material consist of the single step of subjecting the photoresist layer and the support layer to a developer in which the support layer is soluble.

3. A method according to claim 1 further comprising the step of, after removing the remaining photoresist and remaining support layer material, forming a protective overcoat over the metal alloy or metal oxide and nonmagnetic material.

4. A method according to claim 3 wherein the step of forming the overcoat includes the step of depositing material identical to the nonmagnetic material refilled in the voids.

5. A method according to claim 1 wherein the refilling step includes the step of refilling to a height generally equal to the height of the metal alloy or metal oxide, whereby the surface of the completed disk is substantially planar.

6. A method according to claim 1 wherein the refilling step includes the step of refilling to a height slightly higher than the height of the metal alloy or metal oxide.

7. A method according to claim 1 wherein the step of removing the metal alloy or metal oxide includes the step of sputter etching the magnetic film, and wherein the step of refilling the voids includes the step of sputter depositing the nonmagnetic material immediately after the sputter etching step without breaking vacuum.

8. A method according to claim 1 wherein the step of exposing selected regions of the photoresist layer to radiation further comprises the steps of:
providing a mask having a radiation-opaque pattern including concentric tracks; and
directing radiation through the mask to expose the photoresist.

9. A method according to claim 1 wherein the step of exposing selected regions of the photoresist layer to radiation comprises the step of directly exposing said regions with an E-beam.

10. A method according to claim 1 wherein the step of forming a magnetic film on the substrate further comprises the steps of forming a nucleating film on the substrate and forming a magnetic film directly on the nucleating film.

11. A discrete track film metal alloy or metal oxide magnetic recording disk comprising:
a disk substrate;
a plurality of discrete concentric tracks of magnetic metal alloy or metal oxide formed on the substrate, the top surfaces of the discrete tracks being generally coplanar; and
a layer of continuous nonmagnetic material formed over the top surfaces of the tracks and over the substrate between the tracks, said nonmagnetic material layer forming a plurality of concentric guard bands between the tracks and forming a protective overcoat, and the height of said layer in the regions between the tracks being at least as high as the height of said layer in the regions on top of the tracks.

12. The disk according to claim 11 further comprising a nonmagnetic metal or metal alloy nucleating film formed between the substrate and the tracks, and wherein the layer of nonmagnetic material is formed on the nucleating film in the regions between the tracks.

13. The disk according to claim 11 wherein the height of said layer in the regions between the tracks is greater than the height of said layer in the regions on top of the tracks.

14. A discrete track thin film metal alloy magnetic recording disk for use in a disk file of the type wherein an air-bearing slider supports the read/write head, the disk comprising:
a disk substrate;
a plurality of discrete concentric tracks of magnetic cobalt-based alloy sputter deposited over the substrate to form guard bands on the substrate in the area between the magnetic tracks, the top surfaces of the guard bands of nonmagnetic material being generally coplanar and higher than the top surfaces of the magnetic tracks; and
a continuous overcoat layer of nonmagnetic material sputter deposited to a generally uniform thickness over the top surfaces of the guard bands and the magnetic tracks to form a protective overcoat.

15. The disk according to claim 14 wherein said nonmagnetic overcoat layer consists essentially of alumina or amorphous carbon.

16. The disk according to claim 14 wherein said nonmagnetic guard bands consist essentially of amorphous carbon or alumina.

17. The disk according to claim 14 wherein the disk substrate is formed of an aluminum alloy with a nickel-phosphorus surface film thereon, further comprising a film of chromium or chromium alloy formed on the nickel-phosphorus film between the nickel-phosphorus film and the sputter deposited magnetic tracks, and wherein the nonmagnetic guard band material is sputter deposited directly on the chromium or chromium alloy film in the area between the magnetic tracks.

18. The disk according to claim 14 wherein the nonmagnetic guard bands and the overcoat layer are made from the same material.

* * * * *

UNITED STATES PATENT AND TRADEMARK OFFICE
CERTIFICATE OF CORRECTION

PATENT NO. : 4,935,278

DATED : June 19, 1990

INVENTOR(S) : Krounbi, Potlatch, and Sanders

It is certified that error appears in the above-identified patent and that said Letters Patent is hereby corrected as shown below:

In the Claims in column 8 at line 24, claim 14 should read:

14. A discrete track thin film metal alloy magnetic recording disk for use in a disk file of the type wherein an air-bearing slider supports the read/write head, the disk comprising:
   a disk substrate;
   a plurality of discrete concentric tracks of magnetic cobalt-based alloy sputter deposited over the substrate, the tip surfaces of the discrete magnetic tracks being generally coplanar;
   a plurality of discrete concentric tracks of nonmagnetic material sputter deposited over the substrate --
to form guard bands on the substrate in the area between the magnetic tracks, the top surfaces of the guard bands of nonmagnetic material being generally coplanar and higher than the top surfaces of the magnetic tracks; and
   a continuous overcoat layer of nonmagnetic material sputter deposited to a generally uniform thickness over the top surfaces of the guard bands and the magnetic tracks to form a protective overcoat.

Signed and Sealed this

First Day of October, 1991

Attest:

*Attesting Officer*

HARRY F. MANBECK, JR.

*Commissioner of Patents and Trademarks*